US005591239A

United States Patent [19]

Larson et al.

[11] Patent Number: 5,591,239

[45] Date of Patent: Jan. 7, 1997

[54] NONWOVEN ABRASIVE ARTICLE AND METHOD OF MAKING SAME

[75] Inventors: Eric G. Larson, Lake Elmo; Rufus C. Sanders, Jr., Burnsville; Brent D. Niccum, North St. Paul; Walter W. Pawlikowski, St. Paul; Elizabeth C. Edblom, Minneapolis, all of Minn.

[73] Assignee: Minnesota Mining and Manufacturing Company, St. Paul, Minn.

[21] Appl. No.: 297,807

[22] Filed: Aug. 30, 1994

[51] Int. Cl.$^{6}$ .................... B24D 3/02; C09K 3/14

[52] U.S. Cl. .................... 51/294; 51/299

[58] Field of Search .................... 51/294, 295, 296, 51/298, 299, 293

[56] References Cited

U.S. PATENT DOCUMENTS

| | | | |
|---|---|---|---|
| 2,650,158 | 8/1953 | Eastman | 51/299 |
| 2,733,987 | 2/1956 | Gartrell et al. | 51/299 |
| 2,958,593 | 11/1960 | Hoover et al. | 51/295 |
| 3,026,190 | 3/1962 | McMahon et al. | 51/299 |
| 3,177,055 | 4/1965 | Ruckle et al. | 51/295 |
| 3,401,491 | 9/1968 | Schnabel et al. | 51/295 |
| 3,663,268 | 5/1972 | Wilson | 156/335 |
| 3,817,976 | 6/1974 | Bakul et al. | 260/826 |
| 4,018,575 | 4/1977 | Davis et al. | 51/295 |
| 4,189,395 | 2/1980 | Bland | 51/295 |
| 4,609,380 | 9/1986 | Barnett et al. | 51/298 |
| 4,645,699 | 2/1987 | Neveu | 428/95 |
| 4,802,896 | 2/1989 | Law et al. | 51/295 |
| 4,903,440 | 2/1990 | Larson et al. | 51/298 |
| 5,178,646 | 1/1993 | Barber, Jr. et al. | 51/298 |
| 5,306,319 | 4/1994 | Krishnan et al. | 51/298 |

FOREIGN PATENT DOCUMENTS

| | | | |
|---|---|---|---|
| 0166060A3 | 11/1986 | European Pat. Off. . | |
| 0464850A2 | 1/1992 | European Pat. Off. . | |
| 0506264 | 9/1992 | European Pat. Off. | C08J 5/06 |
| 55-020827 | 6/1980 | Japan . | |
| 01316176 | 12/1989 | Japan . | |
| 04096724 | 3/1992 | Japan . | |

OTHER PUBLICATIONS

Fisher, John D., "Water Compatible Phenolic Resins", Proc. Am. Chem. Soc., Div. 8, Pol. Mat. Sci. & Eng. 65 (1991), pp. 275–276.

"Scotch–Brite Cutting and Polishing Unitized Wheels", 3M Product Brochure Publication, 1989, pp. 1–3.

Technical Data Publication, "HYCAR 1581" no date BF Goodrich Company, Chemical Group, Cleveland, OH, pp. 1–2.

Technical Data Publication "HYCAR 2679" 1990 (no month) BF Goodrich Company, Specialty Polymers & Chemicals Div., pp. 1–10.

*Primary Examiner*—Deborah Jones
*Attorney, Agent, or Firm*—Gary L. Griswold; Walter N. Kirn; Daniel R. Pastirik

[57] ABSTRACT

An open low-density abrasive article comprising in combination:

(a) a lofty, open, nonwoven three-dimensional fibrous web formed of a plurality of interentangled randomly-extending polyamide staple fibers including points of intersection and contact between the fibers, the points of intersection and contact between the fibers being bonded together to form a three-dimensionally integrated structure throughout the web, wherein the fibers comprise surfaces and a fiber tenacity of less than 5 g/denier; (b) abrasive particles dispersed throughout the web and securely adhered to the surfaces of the fibers; and (c) resinous material dispersed throughout the web comprising (i) a hard phenolic resin formed as a cured product of a phenolic resin precursor distributed throughout the web and in contact with the fibers, and (ii) a modifier component of the type and in an amount effective to substantially prevent chemical degradation of the fibers while in contact with the phenolic resin precursor. The invention also relates to methods of making such an abrasive article and converted forms of the abrasive article.

57 Claims, No Drawings

NONWOVEN ABRASIVE ARTICLE AND METHOD OF MAKING SAME

BACKGROUND OF THE INVENTION

1. Field of the Invention

The present invention relates to open low-density nonwoven abrasive articles, and methods of making same, including a fibrous web treated to have resistance to phenol attack and formed of polyamide staple fibers having low tenacity.

2. Description of the Related Art

Nonwoven abrasive articles are known and have been described, for example, in U.S. Pat. No. 2,958,593 (Hoover et al.), and generally comprise fibers formed into a nonwoven web provided as a foraminous three-dimensional integrated network structure with fine abrasive particles and curable binder attached thereto. Such nonwoven abrasive articles are useful in discrete sheet form as well as in various converted forms, such as wheels, discs, and flap brushes. In these converted forms, the resulting articles are useful to scour, clean, condition, and/or decorate the surfaces of such materials as metal, wood, plastics, glass, ceramics, and composites.

The fibers that have been used in the known nonwoven abrasive articles are formed from various polymers, including polyamides, polyesters, polypropylene, polyethylene, and various copolymers. Naturally occurring fibers such as cotton, wool, bast fibers, and various animal hairs may also be suitable. Suitable abrasive particles can be formed of flint, garnet, aluminum oxide, diamond, silicon carbide, etc. Binders commonly comprise cured versions of hide glue or varnish, or one or more resins such as phenolic, urea-formaldehyde, melamine-formaldehyde, urethane, epoxy, and acrylic resins. Phenolic resins include those of the phenol-aldehyde type. Prior abrasive nonwoven constructions include SCOTCH-BRITE™ products sold by 3M Company, St. Paul, Minn., of a type requiring the use of solvent-coated cross-linked urethanes in the prebond to provide the requisite elasticity and protect nylon fibers of the web from attack by subsequently applied phenolic make coates used for bonding of mineral abrasive into the web.

Nonwoven abrasive articles have been made by the following generally known scheme. A "prebond" coating of a binder precursor solution without containing abrasive particles, which includes one or more of the above-named resins, is coated on the web and cured by exposure to heat in order to impart sufficient strength to the nonwoven web for further processing. Then, a "make" coating based on a resinous organic binder is applied to the web to secure fine abrasive grains throughout the lofty fibrous mat and cured. Thereafter, a "size" coating of resinous binder material and abrasive particles is applied, usually by spray-coating, over the prebonded web to increase the abrasive characteristics of the article, such as preventing the abrasive mineral from shelling. Then, the size coating is cured. The resins of the various prebond, make, and size coatings could be the same or different, depending on the various web and abrasive particle properties desired.

Phenolic resin binders, in particular, are used extensively to manufacture nonwoven abrasive articles because of their thermal properties, availability, low cost, and ease of handling. The monomers currently used in greatest volume to produce phenolic resins are phenol and formaldehyde. Other important phenolic starting materials are the alkyl-substituted phenols, including cresols, xylenols, p-tert-butylphenol, p-phenylphenol, and nonylphenol. Diphenols, e.g., resorcinol (1,3-benzenediol) and bisphenol-A (bis-A or 2,2-bis(4-hydroxyphenyl)propane), are employed in smaller quantities for applications requiring special properties.

There are two basic types of phenolic resins: resole and novolak phenolic resins. Molecular weight advancement and curing of resole phenolic resins are catalyzed by alkaline catalysts. The molar ratio of aldehyde to phenolic is greater than or equal to 1.0, typically between 1.0 and 3.0. In the production of adhesive coatings for nonwoven abrasives, one standard starting phenolic resin composition is a 70% solids condensate of a 1.96:1.0 formaldehyde:phenol mixture with 2% potassium hydroxide catalyst added, based on the weight of phenol. The phenolic resin composition is typically 25–27% by weight water and 3–5% by weight propylene glycol methyl ether, which were thought required to reduce the viscosity of the resin of the conventional phenolic formulations. Before this resin is used as a component of a make or size coating, i.e., to make it coatable, further viscosity reduction is often achieved by addition of volatile organic compounds, which are commonly referred to by the abbreviation "VOCs". A conventional binder precursor solution containing a phenolic resin which is used to produce a prebond coating for a nonwoven web contained up to 40% by weight of a VOC, such as isopropyl alcohol, to reduce the viscosity and make the phenolic resin compatible with other binder components, while a binder precursor solution which was used to produce a size coating might contain up to 20% by weight of a VOC, such as diethylene glycol ethyl ether.

In order to reduce emissions of VOCs, it has been suggested to increase the water compatibility of phenolic resins. J. D. Fisher, in an article entitled "Water Compatible Phenolic Resins" in *Proceedings of the American Chemical Society, Division of Polymeric Materials: Science and Engineering*; No. 65, pp. 275–276 (1991), describes methods of making "water compatible" phenolic resins, their benefits, and their shortcomings. However, it would be desirable to be able to adjust the water compatibility of the binder without the need for fastidious management and oversight of the cure system dynamics or the need for additional operations and equipment to chemically synthesize a functionalized or otherwise structurally altered phenolic binder molecular structure.

Also, a compatibility problem arises from the use of the phenolic binder in particular together with a nonwoven web based on polyamide fibers. A particularly useful known nonwoven abrasive article is one comprising a web of polyamide fibers and resole-type phenolic resins as the curable binder. Such a composition provides for strong, tough, temperature resistant abrasive articles that may be made economically. However, as a drawback, it is known that free phenol, which is typically present in resole phenolic resins, can chemically attack and thereby weaken such polyamide fibers. One adverse effect of this corrosive phenol attack on the poly, amide fibers is the embrittlement of the fibers, which entailed a loss of flexibility, resilience, elongation and the like in the fibers individually and the web as a whole. Prior to the present invention, the practice employed to alleviate this problem was to use polyamide fibers that have been highly drawn. Such fibers exhibit a tenacity typically in the 5.5 g/denier to more than 8 g/denier range. The morphology of such highly-drawn fibers tends to be more crystalline, and both amorphous and crystalline regions are highly oriented. Such morphology provides a barrier to the rapid attack of free phenol since the diffusion rate of phenol into the fiber is substantially decreased. While this method overcomes the problem of phenol attack, other problems are presented in processing. For example, it is more difficult to impart a stable crimp in such highly drawn fibers and, therefore, the processing into a nonwoven web can be more difficult. In addition, the additional processing equipment and supervision required to manufacture such highly oriented fibers is significant from an economic standpoint. It would be highly attractive to the industry to be able to employ intermediate and low tenacity low tensile strength polyamide fibers which need not be subjected to special orientation enhancing procedures, such as having a tenacity below 5 g/denier, while otherwise preventing the phenol attack on the fibers.

Further, as with other conventional phenolic systems for binding fibrous webs, the resole phenolic system employed to consolidate polyamide fiber nonwovens, generally requires the use of at least some volume of VOCs. Such VOCs are typically removed during the manufacturing process and must be recovered or otherwise treated to avoid or minimize atmospheric release. It would be desirable to reduce, if not prevent, the use of VOC solvents in the polyamide fiber/resole phenolic system due to the added costs and inconvenience associated with handling and disposing the VOC solvents. Further, the VOC solvents are thought to aggravate or assist phenol attack of the surfaces of the polyamide fibers.

Modified phenolic resins that provide for reduced VOC emissions for use in nonwoven abrasive articles are likewise known and are described in, for example, commonly assigned U.S. Pat. No. 5,178,646 (Barber, Jr. et al.), where poly(oxyalkylene)amine and urea compounds are employed for this purpose. Rubber-modified phenolic resins have also been used in the manufacture of nonwoven abrasive articles, such as in the disclosure of commonly assigned U.S. Pat. No. 2,958,593 (Hoover et al.), as an optional rubber treatment disposed on one side of the structure to increase the resistance of the overall abrasive article structure to tearing and shredding. For example, Hoover et al. exemplifies a nylon fiber web being first coated with a phenol-formaldehyde and amine terminated polyamide resin-containing coating, followed by transmitting the phenol exposed web to a curing oven where the coated web is so heat-treated such that the emitted treated web is cured to a nontacky state while still warm, and, only thereafter, a rubbery composition based on a butadiene acrylonitrile copolymer latex (viz. trade designation "Hycar®Latex 1561", from B. F. Goodrich Co.) is applied to the opposite side of the web and heat-cured in an oven. In the disclosed arrangement of Hoover et al., the nylon fibers would be exposed and contacted with phenol without any prior fiber orientation or modifier ingredients present at that time being identified therein to counteract phenol attack on the nylon fiber surfaces. Similarly, commonly assigned U.S. Pat. No. 4,189,395 (Bland) discloses a cleansing pad, which slowly releases its surfactant loading in use over an extended period of time. This cleansing pad of Bland comprises a pad impregnated, in a final treatment during manufacture, with a composition comprising a water-insoluble cured acrylic resin having a grease-cutting, suds-forming nonionic surfactant blended therein. The acrylic resin disclosed by Bland can be a latex commercially available under the trade designation "Rhoplex" by Rohm and Haas Co. and "Hycar®H2671 " available from B. F. Goodrich Co. However, the web employed by Bland is disclosed as first being integrated with a binder such as a thermosetting resin comprising phenol-formaldehyde before the web is subjected to the separate later treatment with the surfactant-containing composition. Also, commonly assigned U.S. Pat. No. 4,018,575 (Davis et al.) discloses a low-density abrasive article comprising a fibrous web composed of glass filament bundles. The glass filament bundle web of Davis et al. is disclosed as being prebonded with preferred prebonding resins of polyacrylates, butadiene-acrylonitrile rubbers such as are sold under the trade designation "Hycar®1562", and polyurethanes. Glass fibers are not subject to phenol attack.

The modification of a phenolic resin precursor system used for binding nonhighly drawn, lower tenacity polyamide web fibers by the presence of a modifier agent therewith which alleviates, if not prevents, the degradation of polyamide fibers in the presence of phenol is not thought to have been known prior to the present invention.

SUMMARY OF THE INVENTION

The present invention relates to open low-density abrasive articles that overcome and solve the above-noted problem of phenol attack on relatively low tenacity polyamide staple fibers used in the fibrous web of the article. This invention eliminates the burden and cost associated with imparting high orientation in polyamide fibers while concurrently reducing the need for using solvents comprising volatile organic compounds (i.e., "VOC's") in and with the binder compositions applied to the web.

In general, the present invention relates to an open low-density abrasive article, comprising in combination:

(a) a lofty, open, nonwoven three-dimensional fibrous web formed of a plurality of interentangled randomly extending polyamide staple fibers including points of intersection and contact between the fibers, the points of intersection and contact between the fibers being bonded together to form a three-dimensionally integrated structure throughout the web, wherein the fibers comprise surfaces and a fiber tenacity of less than 5 g/denier;

(b) a plurality of abrasive particles dispersed throughout the web and securely adhered to the surfaces of the fibers; and (c) resinous material dispersed throughout the web comprising (i) a hard phenolic resin formed as a cured product of a phenolic resin precursor distributed throughout the web and in contact with the fibers, and (ii) a modifier component of the type and in an amount effective to substantially prevent chemical degradation of the fibers while in contact with the phenolic resin precursor.

For purposes of this invention, the terms listed below have the following meanings:

"nonwoven" means a web or batt of random or directional fibers held together through mechanical, chemical, or physical methods, or any combination of these; but excluding weaving, knitting, stitching, traditional felting, as well as conventionally formed paper.

"low-density", as used in reference to a nonwoven web herein, means an extremely open structure having an extremely high void volume.

"open", as used in reference to a nonwoven web herein, means that web thicknesses of about one-fourth inch (6 mm) are highly translucent or even transparent when held up to light, e.g., ordinary daylight, under conditions where substantially all of the light registering on the viewer's eyes passes through the structure.

"tenacity" means the tensile strength of the fiber at breakage measured by the breaking stress in grams per denier of fiber.

"staple fibers" means short fibers, e.g., crimped and chopped fibers in comparatively short and uniform lengths.

"chemical degradation", means chemical-induced damage to a fiber surface or structure, for example, caused by the reaction of phenol in a phenolic resin precursor with polyamide fiber surfaces contacted thereby.

An important aspect of this invention is that during the manufacture of a nonwoven abrasive article, the nonwoven fibrous web containing low tenacity (i.e., <5.0 g/denier) polyamide staple fibers is contacted with the modifier or modifying agent, described herein, no later than the first time the polyamide fibers in the web are exposed to and contacted by phenol of a phenolic resin precursor. For purposes of this invention, the feature of contacting the polyamide fibers no later than the first contact with phenolic resin precursor includes the situation where the modifying agent is applied to the web contemporaneous with the phenolic resin precursor. The present invention can be practiced in the mode where the modifying agent, described herein, is first applied to the web before subsequent coating of the first phenolic resin precursor thereon in a wet-on-wet operation. On the other hand, "contemporaneous", as the term is used herein, means the modifying agent and phenolic resin are applied simultaneously to the web from the same coating composition which comprises a complete physical mixture of these components. Sequential, separate coatings are not considered "contemporaneous" for purposes of this invention whether wet-on-wet or wet-on-dry coating operations are involved.

Therefore, in another embodiment of the invention, the modifying agent is combined with a phenolic resin precursor used in a prebond coating applied to the nonwoven web. In a further embodiment, the modifying agent also is added to the make coat, following the prebond coating, where the make coat also is based on a phenolic resin precursor as the binder. The addition of the modifying agent to the phenolic resin in the make coat has been found to improve the tensile properties of the nonwoven web, among other things.

Surprisingly, the nonwoven abrasive articles of the present invention have adequate wear, tensile and elongation properties for typical scouring applications, even though nonoriented lower-tenacity (i.e. <5.0 g/denier) polyamide fibers are employed in the webs thereof, which fibers have been exposed to phenol from a coatable, curable phenolic binder. Additionally, and significantly, it has been found that a loss in tear resistance by a web not modified pursuant to the present invention, such as observed when substituting low tenacity polyamide fibers for the high tenacity polyamide fibers, is compensated for and the tear resistance is actually regained when the web is treated with the modifier used in this invention.

In another embodiment of the invention, the binder composition(s) applied to the nonwoven web, such as any one of or combination of the prebond coat, make coat and size coat, involve a formulation using a VOC-free solvent, preferably water, as carrier for the binder precursor material(s). Examples of VOCs that are reduced in their amounts or even avoided entirely in the binder compositions used in the present invention include glycol ethers (e.g., ethylene glycol monoethyl ether or ethylene glycol monomethyl ether) and lower aliphatic alcohols (e.g., methyl alcohol, ethyl alcohol, isopropanol). Therefore, the otherwise added burdens, cost and inconvenience associated with handling, recovering, and proper disposing of VOC solvent emissions are at least reduced if not completely avoided in the present invention. Also, there are no VOC solvents present to possibly aggravate or assist phenol attack of the surfaces of the polyamide fibers. Under the conventional wisdom, the absence of the VOCs in the binder composition, such as a phenolic prebond coating, would have been predicted to cause an unacceptable detraction in viscosity regulation and compatibilization of components to prevent acceptable binder coating of the web. Yet, the present inventors have discovered that the wettability of the phenolic resin on the fibers of the nonwoven web is rendered fully acceptable when the phenolic resins are co-blended with the modifier compounds described herein. Therefore, in one aspect of the present invention, water ($H_2O$) only is used as the solvent of the binder systems based on phenolic binder precursors, such as for the prebond coating, that are applied to the polyamide fiber webs in making the nonwoven abrasive articles of the present invention.

The "modifier", or occasionally referred to herein as the "modifying agent", used in the present invention comprises a rubber material such as, for example, arylic rubber, natural rubber, polyisoprene and carboxy-modified nitrile rubber. Preferably, the modifier comprises an acrylic rubber. The acrylic rubber preferably is applied to the nonwoven web in the form of an emulsion of acrylic ester copolymer solids, and then dried.

In a further embodiment, the polyamide fibers are used as the main component fiber of the nonwoven web. That is, the polyamide fibers constitute greater than 50% up to 100% by weight of the total dry fiber weight of the nonwoven web prior to the binder coating thereof. The polyamide fibers are selected from the group consisting of polycaprolactam fibers (nylon 6) and fibers formed of polymers of hexamethylene diamine and adipic acid (nylon 6,6). The polyamide staple fibers used in the web of the nonwoven abrasive article of this invention have a tenacity value less than 5 g/denier, preferably in the range of 1.0 to 4.9 g/denier, and more preferably in the range of 1.0 to 4.6 g/denier.

In one embodiment, the fibrous web used in the nonwoven abrasive article of the invention can contain fibers which are substantially 100% polyamide staple fibers having a tenacity of less than 5.0 g/denier. In the alternative, the fibrous web can be formed of a combination of polyamide staple fibers, with some fibers having a tenacity below 5.0 g/denier and other polyamide staple fibers having a tenacity higher than 5.0 g/denier. In any event, the nonwoven abrasive article of the invention can tolerate the presence of any amount of polyamide staple fibers having a tenacity below 5.0 g/denier without losing adequate tensile, wear, tear resistance and elongation properties in the nonwoven article as long as the web has been treated during manufacture with the modifying agent or modifier used in this invention to prevent and counteract phenol attack on the low tenacity (i.e. <5.0 g/denier) polyamide fibers present.

In another embodiment of the invention, there is a method for making the aforesaid nonwoven abrasive articles of the invention comprising applying a prebonding composition containing phenolic resin or binder precursor and the modifying agent to a lofty, open, nonwoven three-dimensional fibrous web formed of a plurality of interentangled randomly extending polyamide staple fibers including points of intersection and contact between the fibers, wherein the fibers have a fiber tenacity of less than 5 g/denier, by impregnating the web with the prebonding composition sufficient to bond the fibers together at the points of intersection and contact between the fibers to form a three-dimensionally integrated structure throughout the web. It is imperative that the modifying agent of the invention is applied and present on the fiber surfaces of the web contemporaneous to or before the fibers are first contacted with the phenolic binder precursor. Thereafter, the prebonded web is coated with a make and/or size coat also comprising a phenolic resin precursor to further consolidate the web and adhere abrasive particles to the web.

In a further embodiment of the invention, the nonwoven abrasive articles of this invention are used in convenient desired convened forms such as wheels, discs, and brushes. The nonwoven abrasive articles of the invention can be spirally wound upon a core to provide such a convened form.

DETAILED DESCRIPTION OF THE PREFERRED EMBODIMENTS

The abrasive article of the invention includes an open, lofty nonwoven fibrous web having a three-dimensional integrated structure of adhesively interconnected fibers having abrasive particles bonded to the web fibers by means of a binder. In the present invention, a modifying agent (or modifier) is applied to fibers in the web prior, or at least contemporaneously with, but in no event later than, the coating of the fibers in the web with a phenolic resin precursor used to bind web fibers at touching points and bind abrasive particles to the web fibers. While not desiring to be bound to any one theory at this time, it nonetheless is believed that the modifier or modifying agent of the present invention does not modify the phenolic resin precursor in a chemical sense. Instead, the presence of the modifier on the fiber surfaces no later than the time the fibers are first contacted by the phenolic resin precursor is thought by the present inventors to interfere with and otherwise prevent phenol in said phenolic resin precursor from chemically attacking (i.e., degrading) low tenacity (i.e., less than 5 g/denier) polyamide fiber surfaces contacted thereby.

In a preferred embodiment of the present invention, the modifying agent or modifier is an emulsifiable rubber which is compatible with water-based phenolic resins. Suitable modifiers for this invention include emulsions of acrylic rubbers, natural rubber, polyisoprene, acrylic rubbers, and carboxy-modified nitrile rubber. Suitable modifiers include rubber latexes commercially available under the trade designation series "Hycar®" from B. F. Goodrich Co., Cleveland Ohio. Of these, suitable specific latexes include those available under the trade designations "Hycar® 2679", which is a heat-reactive acrylic latex polymer, which, more specifically, is an anionic emulsion of an acrylic ester copolymer in water having a neutral to acidic pH; and "Hycar® 1581", which is a carboxy-modified butadiene-acrylonitrile latex having an alkaline pH of greater than 7.0. The heat-reactive acrylic latex polymers are preferred in this invention because they tend to disperse more easily in phenolic resins at relatively lower shears. The carboxy-modified butadiene-acrylonitrile latexes have been observed to need higher shear requirements than the acrylic latexes to achieve dispersion in the phenolic resin, and, accordingly, appropriate management of the modifier-phenolic resin mixing procedure should be taken in light of these observations. Also, if the pH of the modifying agent is greater than 9, there is an increased risk that the alkaline modifying agent might cause premature curing of the phenolic resin. On the other hand, if the modifying agent has a pH which is too strongly acidic, the modifying agent could neutralize the phenolic resin catalyst (which is alkaline). Therefore, the modifying agents for this invention generally have a pH in the range of 2 to 9, more preferably a pH in the range from about 4 to about 7.

In somewhat more detail, the fibers of the nonwoven web of the present invention are firmly bonded together at points where the fibers intersect and contact one another by relatively hard rigid globules of organic binder, thereby forming the three-dimensionally integrated structure. The abrasive particles are distributed within the web and are firmly adhered by the binder globules at variously spaced points along the fibers. The interstices between the fibers are substantially untilled by resin or abrasive, creating a void volume. The abrasive particles can be observed, such as under a common microscope, as being embedded within the binder globules and thereby bonded firmly to the fibers. An impregnation, as that term normally is employed, of the web by the binder and abrasive does not occur. Instead, the triodimensionally extending network of large, intercommunicating voids extending throughout the article is defined among the binder treated fibers. The fibers, in the main, are uncoated or only extremely thinly coated by the binder.

It is one observation of the bonded network of the nonwoven web of this invention that the phenolic resin and abrasive particles are less uniformly distributed over all fiber surfaces than would be observed with conventional phenolic binder coatings lacking the modifying agent additive. Instead, the beading of the binder and abrasive particles at the fiber junctions is observed to be increased in the present invention. It is postulated that this effect is attributable to the modifying agent altering the surface tension of the binder composition and the wet out of the abrasive particles. In any event, this phenomenon of increased beading of the binder and abrasive particles improves web tear properties of the bonded nonwoven. Also, the increased concentration of the abrasive particles at the beads, rather than as a more uniform distribution over all the fiber surfaces, does not detract from the performance of the finished web as an abrasive article, e.g., as converted to an abrasive wheel, as might be theorized. The cut performance of the inventive nonwoven abrasive article can be improved because the denser agglomerates formed at fiber intersections of the web from the binder and mineral, such as applied from the make coating, have less tendency to shell, and additionally, web wear is reduced because of the elasticity (i.e. shock absorbing property) and stronger tear property contributed from the unattached (unbonded) parts of the nylon fibers in the web. Further, as cut performance is also highly dependent on the density, type and size of the abrasive material, these parameters also can be adjusted according to principles known in the art to further enhance the cutting property.

An open web providing conformability and constant, controlled abrasive contact are the main characteristics required of the abrasive web. The cut, which is brought about by the mineral, depends on mineral type, size (grit) and density of the mineral in the nonwoven carrier. Where the abrasive web is converted into an abrasive wheel form, such as by techniques described herein, the life or wear of the abrasive wheel is affected by machine parameters such as speed and pressure, yet remains very dependant on its own wheel construction which includes fiber, coating and mineral parameters. The performance of the abrasive wheel can be assessed by the ability of the wheel to obtain the desired cut in a workpiece (i.e., the cut) with the least effort (drive on the wheel), for the longest period of operation as possible (i.e., the wear). To analyze this property of the cut/wear of the abrasive wheel, the wheels can be compared under fixed grinding conditions, such as a fixed specific type of metal workpiece and under fixed machine conditions.

The elasticity of the Hycar™ latex coating contributes to overall performance by providing a tougher, more wear resistant web, so that a lower tenacity polamide fiber can be effectively used in the nonwoven.

In any event, the fibers in the bonded web of the present invention remain resilient and yieldable, permitting, in turn, the web structure to be extremely flexible and yieldable, whereby the abrasive particles are extremely effective. Accordingly, the abrasive article structures of this invention are flexible and readily compressible and, upon subsequent release of pressure, essentially completely recover to the initial uncompressed form.

As explained above, with many interstices between adjacent fibers remaining substantially untilled by the binder and abrasive particles, there is provided a composite structure of extremely low density having a network on many relatively large intercommunicated voids. The resulting lightweight, lofty, extremely open fibrous construction is essentially non-clogging and non-filling in nature, particularly when used in conjunction with liquids such as water and oils. These structures also can be readily cleaned upon simple flushing with a cleansing liquid, dried, and left for substantial periods of time, and then reused. Towards these ends, the voids in the abrasive article of this invention make up at least about 75%, and preferably more, of the total space occupied by the composite structure. The extreme openness and low density of the web of the inventive abrasive article is important. In general, the void volume of the abrasive article, i.e., ratio of void space volume/total article volume, is maintained within the range from about 75 percent to about 98 percent, preferably from about 85 to about 95 percent. Structures where the void volume is below about 75 percent have decreased cleanability, flushability, and lower cutting rate. Also, the extreme translucency of the abrasive article drops off rapidly at such lower ranges of void volume and openness. Structures where the void volume is somewhat less than 85 percent are useful for most scouring purposes, though not ordinarily recommended as being optimal. On the other hand, as the void volume exceeds about 95%, there may be insufficient physical structure in the three-dimensional fibrous network to provide adequate web strength and durability.

Fibers suitable for use in the nonwoven web of the abrasive article of the present invention are based mainly on polyamide staple fibers of tenacity between 1.0 and 5.0 g/denier, preferably 1.0 to 4.6 g/denier. The polyamide fibers constitute greater than 50%, up to 100%, by weight of the total dry fiber weight of the nonwoven web prior to application of the binder coatings thereon. The fibers which can be used as a minor fraction in the nonwoven web, together with the polyamide fibers, include natural and synthetic fibers such as cotton, rayon, polyester, and polyester terephthalate. The fibers also can be comprised in part by bicomponent fibers, such as having sheath-core constructions. That is, a bicomponent fiber can be used as a binder fiber using a relatively high melting temperature polymer material for the core portion and retatively low melting temperature polymer material for the sheath portion of the bicomponent fiber. The bicomponent fibers, when used in the fiber web, generally comprise about 20 to 40% weight fraction of the total fiber content of the web.

Polyamide fibers of a tenacity below 1.0 g/denier are generally too fragile to process through existing web-forming machines, thus, representing a practical constraint. Polyamide fibers of tenacity 5.0 g/denier or higher are expensive to manufacture due to the special orientation procedures typically needed to achieve such a tenacity level and, also, they are difficult to impart stable crimp therein. However, it is within the scope of the invention to use a blend of polyamide fibers having different tenacities including a physical mixture of fibers having a low-fiber tenacity below 5 g/denier and fibers having a high-fiber tenacity above 5 g/denier. For instance, it is possible to use a web comprised of 1–99% by weight polyamide staple fibers having a tenacity of less than 5.0 g/denier, such as from 4.0 to 4.9 g/denier and 99–1% by weight polyamide staple fibers having a tenacity greater than 5.0 g/denier, such as from 8.0 to 8.5 g/denier. One example of a useful blend of polyamide staple fibers having different tenacities for use as the nonwoven web component of the nonwoven abrasive article of this invention includes a physical blend of about 80% by weight of the web (sans coating weights) comprising polyamide staple fibers having a tenacity of about 4.5 to 4.9 g/denier and about 20% by weight of the web (sans coating weights) comprising polyamide staple fibers having a tenacity of about 8.0 to 8.5 g/denier.

In the interest of obtaining maximum loft, openness and three-dimensionality in the web, it is preferable that all or a substantial amount of the fibers be crimp-set. However, crimping retention is unnecessary where fibers are employed which themselves readily interlace with one another to form and retain a highly open lofty relationship in the formed web. For purposes of this invention, fiber tenacity is determined according to the industrial standard procedure ASTM Designation: D 3822-91, "Tensile Properties of Single Textile Fibers".

While it is not believed that there exists a limitation on the particular types of polyamide that can be successfully incorporated into the abrasive articles of this invention, nylon 6 comprising polycaprolactam, and nylon 6,6 comprising polymers of hexamethylene diamine and adipic acid, are preferred from availability and adequate performance considerations. Nylon 6,6 is most preferred as the web fiber used in the present invention. The staple length of the fibers of this invention may be from about 1.75 cm to 15 cm, preferably 3.0 cm to 7.5 cm. The appropriate crimp level (as measured full-cycle) can be between about 3.75 crimps/cm and about 6.5 crimps/cm, preferably from about 3.9 crimps/cm to about 5.9 crimps/cm. Useful staple fibers for the practice of the present invention include a 15 denier staple fiber of nylon 6,6 cut to about 3.8 cm staple length, commercially available under the trade designation "Type T-852", and a "Type T-101" polyamide fiber having a tenacity of 4.0 g/denier and fiber length of 3.8 cm, both supplied by E. I. DuPont de Nemours, Wilmington, Del. The diameter of the fiber is not crucial, as long as due regard is had to resilience and toughness ultimately desired in the resulting web. With "Rando-Webber" equipment, fiber diameters are typically within the range of about 25 to 250 micrometers.

Web formation equipment suitable for the practice of this invention includes any such equipment capable of forming a fabric from the fiber described above. Cards, garnets, wet-lay, and air-lay equipment may be used. Air-lay is preferred. Appropriate air-lay equipment includes the commercially known "Rando Webber" or "Dr. O. Angleitner" (or "DOA") equipment.

Many types and kinds of abrasive minerals can be employed. Suitable abrasive particles include those such as flint, talc, garnet, aluminum oxide, silicon carbide, diamond, silica, and an alpha-alumina ceramic material available commercially under the trade designation "CUBITRON" from 3M Company, St. Paul, Minn. The abrasive particles generally have an average particle size in the range of 20 to 100 microns. The abrasive particles are generally present in the web in a range amount of from 80 to 400 grams per square meter. The abrasive particles and the total amount of hard phenolic resin contained in the web generally are in a weight ratio of 1:1 to 4:1, respectively.

Binders are used to consolidate the fibers into a three-dimensional web network and/or to attach the abrasive particles to the surfaces of the fibers, viz., at their crossing and contacting points. In the present invention, the abrasive mineral binders used in this invention are phenolic resins.

In a preferred embodiment of the invention, a phenolic resin precursor is used as the prebonding material to lightly bond the web sufficiently to impart enough web integrity to withstand further processing of the web. The modifying agent or modifier must be applied to the fibers of web before or contemporaneous to, but not later than, the application of this prebond coating to the web, except where the prebonding coating, or any other prior coating, for that matter, does not contain phenolic resins. It is preferred to use a phenolic binder in the prebond composition.

Elasticity is desirable in the prebond web because the web must be flexible to go through roll coaters for the make coat add-on. Elasticity of the web is related to the composite of fiber and coating. Web tensile is closely related to fiber strength and polymer orientation. Web cross-tear reflects on the entaglement of the nonwoven, fiber coating add-on, shear resistance of the bond sites, etc.

By adding the Hycar™ to the phenolic, the inventors have increased the elasticity of the composite web. Phenolic coatings have poor elongation and result in brittle webs. Improvements that were observed in web tensile and tear with increasing amounts of Hycar™ (decreasing amounts of phenolic) also can be attributed, it is believed, to this phenomenon and not exclusively to protection of the nylon.

However, it is also considered within the scope of the invention that the consolidation of the web by the prebonding operation, i.e., providing interbonding contact and crossing points of the fibers into a three-dimensional integrated web structure, optionally can be achieved by use of a prebonding treatment using a nonphenolic resin binder, such as hide glue, urethane, acrylic resins, urea-formaldehyde, melamine-formaldehyde, epoxy or combinations thereof. Preferably, the nonphenolic prebond coating is entirely water-based to completely eliminate the presence of VOC solvents. One suitable water-based prebond coating that is nonphenolic is an epoxy novolak mixture of "WITCOBOND" and "EPIREZ"; "WITCOBOND" being supplied by Witco Company, Chicago, Ill. Although not essential, the modifying agent can be introduced into the nonwoven web for the first time as a component of a nonphenolic prebond coating. In either situation of phenolic or nonphenolic prebond, the amount of binder employed to prebond the web in this manner ordinarily is adjusted toward the minimum consistent with bonding the fibers together at their points of crossing contact, and, in the instance of the abrasive binder, with firm bonding of the abrasive grains as well.

As indicated above, the abrasive particles typically are attached to the fibers in abrasive articles of the present invention by use of phenolic resins. The phenolic resins are especially well-suited to the environment and demands at hand in light of their combined properties of rather low coefficient of friction in use (e.g., they do not become pasty or tacky in response to frictional heat) and are relatively hard and rigid upon cure. Phenolic resins suitable for the present invention include both resole and novolak type phenolic resins. Typically, the monomers used to produce phenolic resins are phenol and formaldehyde. Other important phenolic starting materials are the alkyl-substituted phenols, including cresols, xylenols, p-tert-butylphenol, p-phenylphenol, and nonylphenol. Diphenols, e.g., resorcinol (1,3-benzenediol) and bisphenol-A (bis-A or 2,2-bis(4-hydroxyphenyl)propane), are employed in smaller quantities for applications requiring special properties.

Molecular weight advancement and curing of resole phenolic resins are catalyzed by alkaline catalysts. The molar ratio of aldehyde to phenolic is greater than or equal to 1.0, typically between 1.0 and 3.0. In the production of adhesive coatings for nonwoven abrasive articles of this invention, one standard starting phenolic resin composition is a 70% solids condensate of a 1.96:1.0 formaldehyde:phenol mixture with 2% potassium hydroxide catalyst added based on the weight of phenol. Preferred is a resole-type phenolic resin comprising phenol and an aldehyde, for example, a 2:1 formaldehyde:phenol composition with a NaOH catalyst. In order to eliminate the need for VOC solvents, the preferred phenolic resin has a water tolerance as measured by the method described herein of at least 100%, most preferably at least 140%. The phenolic resins used in the web generally have a Knoop hardness value of at least 40 after curing. The total phenolic resin solids present in the web generally is in a range amount of from 50 to 250 grams per square meter.

The binder coatings used in the present invention preferably are water-based and free of VOC solvents and adjuvants. The water component of the phenolic resin-based roll coatings of the present invention (make or size coatings) generally is present, by weight, in a range of about 20 to 45% water, preferably 25 to 43%, based on the combined weight of water and the phenolic resin component.

In addition to abrasive particles, the coatable, curable binder precursor compositions used in this invention, including resole phenolic binder precursors, may optionally contain other additives. For example, conventional resin fillers, such as calcium carbonate or fine fibers, optionally can be used in amounts of zero to up to 50% by weight based on the weight of the total binder coating composition. Also, lubricants, such as alkali metal salts of stearic acid, can be used in amounts up to 30% by weight of the binder coating composition. Grinding aids, such as potassium fluoroborate, can be used at levels of zero up to about 50% by weight of the total resin. Wetting agents or surfactants, such as sodium lauryl sulfate, can be used in amounts of zero up to about 5% by weight total resin. Defoaming agents can be used as needed in amounts of zero up to about 5% by weight total resin. Pigments or dyes can be added in amounts of zero up to about 30% by weight total resin. Coupling agents, such as organofunctional silanes, can be added in amounts of zero up to about 2% by weight total resin. Plasticizers, such as polyalkylene polyols or phthalate esters, can be added in amounts of zero up to about 20% by weight total resin. For example, high molecular weight polyols such as polyalkylene glycols, such as JEFFAMINE (PEG 400), can be used to plasticize the phenol. Additionally, viscosity modifiers or suspending agents, such as methyl cellulose, can be added in amounts up zero to about 30% by weight total resin. Urea also can be added to the phenolic resin to scavenge formaldehyde and increase water tolerance. The urea is used in an amount of zero up to about 5% by weight total resin.

In one typical scheme of making the nonwoven abrasive article of this invention there are the steps of, in this sequence, applying a prebond coating to the web, such as by roll-coating or spray coating; optionally cutting the prebonded web into discrete shapes for further processing, such as round disc shapes; applying a make coating to the web, either a roll-coating or spray coating; and optionally applying a size coating to the web, such as by roll-on spray coating. One difference between the prebond coat and a make coat is that the prebond coat is applied to the web with smaller amounts of binder than a make coat, in that the prebond coat merely serves the purpose to lightly bond the web at fiber touching points to an extent that the web is sufficiently strong and integrated to withstand further web processing. Also, the prebond coat does not contain abrasive particles, whereas the make coat of this invention contains abrasive particles. Also, the make coat contains sufficient phenolic binder to adhere the abrasive particles continued therein to the fibers of the web.

In general, the prebond coat is applied to one side of the web, such as by roll or spray coating, then the coated web is transmitted to an oven set for heating at 120° to 210° C. and heated for a dwell time of about 1.5 to 4 minutes to cure the prebond binder precursor.

Then, the make coat is applied to one side of the web, such as by roll or spray coating. The abrasive particles are blown into the web from both sides. Then the coated web is transmitted to an oven set for heating at 130° to 205° C. and heated for a dwell time of about 1.5 to 4 minutes to cure the phenolic resin precursor. It is important that the oven conditions and the web dwell time in the oven should be adjusted and managed as necessary to provide a make coating that is nontacky to the touch while still warm, but without causing blistering, due to too-high temperature or too-high dwell time, of the resin globules, as observed under a microscope. This level of cure of the make coated web helps ensure that the web has adequate web strength before being subjected to further processing. A secondary make coat(s) optionally can be applied after applying and curing the initial make coat, which, in turn, is also heat-cured in the oven.

Thereafter, the size coat, if optionally used, of phenolic resin precursor and optional additional abrasive particles imparted in slurry form with resin is applied to one or both of the same side of the web as previously treated with the make coat or the opposite side of the web, if additional web consolidation and adhesion for the abrasive particles is considered desirable or necessary. The size coat can be applied in this manner such as at a spray booth, and then the coated web is led into an oven set at 160°–212° C. with a dwell time therein of about 1.5 to 4 minutes. Again, care must be exercised to cure the second coating of phenolic resin precursor to a non-tacky state to the touch while still warm, with care again taken in managing the oven conditions and web dwell time to avoid blistering of the globules upon microscopic investigation. Further, the product continuously formed as described above is heated in the oven after the size coat application for a temperature and dwell time effective to complete the cure of all the resin constituents. The major considerations going into the decision to either include or forgo adding a size coat or secondary make coat are that a size coat is necessary for converted abrasive web forms. As converted forms of this invention, there is included a unitized form consisting of stacking layers of web and curing the mass under heat and pressure, while convolute forms involve wrapping the web under tension on a mandrel, then curing the bun. Wheels are then cut cross-sectionally from the cured bun. Both convened forms and methods consolidate and densify the web into more rigid forms. Following cure, the product can be cut into desired sizes, and packaged for shipment into commerce.

Heating equipment suitable for heat-curing the binder-coated nonwoven webs in the practice of this invention generally includes any equipment capable of radiating, convecting or conducting heat for the purpose of subsequent drying and curing of initial and subsequent coatings. Convection heating is preferred. Ovens of this type are available from many commercial oven manufacturers, such as Industrial Heat Enterprises International Co., Franklin Wis.; Infratrol Manufacturing Corp., Milwaukee Wis.; and Drying System Co., Minn. Minn., now a subsidiary of Michigan Oven Co., Chicago Ill.

Useful designs of drying and curing convection ovens include controls over parameters such as ranges for heated air temperature, heated air supply pressure, used air exhaust pressure, fresh air input pressure (also known as "make-up" air pressure) and recirculation air pressure. Supply, exhaust, make-up and recirculation pressures can be controlled by dampers located within the major conveying duct work, allowing a range of each pressure resulting from typical maximum supplied air flow of about 18,000–20,000 cubic feet/minute (about 8.5 to 9.4 cubic meters/second) for each major air pathway. Useful parameters for an oven similar to a Drying Systems Co. design would include the capability to adjust damper position settings.

In one arrangement for drying and curing a prebond coated nonwoven web of the invention, including the embodiment of using a phenolic resin precursor in the prebond coating, the make-up air pressure is controlled by dampers set to allow 40 to 60% of maximum air flow, the supply pressure is controlled by dampers set to allow 80 to 100% of maximum air flow, the exhaust dampers are set to allow 80 to 100% of maximum air flow, and the recirculation pressure is set by damper positions allowing 80 to 100% of maximum air flow.

An alternate scheme for drying and curing of a prebond coated nonwoven web makes the following collection of adjustments to the air flow parameters of the oven. The make-up air pressure is controlled by dampers set to allow 10 to 20% of maximum air flow, the supply pressure is controlled by dampers set to allow 60 to 90% of maximum air flow, the exhaust dampers are set to allow 40 to 80% of maximum air flow, and the recirculation pressure is set by damper positions allowing 5 to 25% maximum air flow.

One preferred scheme for drying and curing a prebond coated nonwoven as described in the invention includes a temperature set-point range of 110°–157° C. and an oven residence time from 1.5–2.5 minutes. The air flow parameters, in this preferred mode, include make-up air pressures controlled by dampers set to allow 40 to 50% of maximum air flow, supply pressure controlled by dampers set to allow 80 to 90% of maximum air flow, exhaust dampers set to allow 80 to 90% of maximum air flow, and recirculation pressure set by damper positions allowing 80 to 90% maximum air flow.

In one arrangement for drying and curing of a make coated nonwoven web of this invention, where the make coat in discussion is the first subsequent binder coating applied on the web following the prebond application, the make-up air pressures are controlled by dampers set to allow 40 to 60% of maximum air flow, supply pressure is controlled by dampers set to allow 80 to 100% of maximum air flow, exhaust dampers are set to allow 80 to 100% of maximum air flow, and recirculation pressure is set by damper positions allowing 80 to 100% maximum air flow.

An alternate set-up for drying and curing of a make coated nonwoven web makes the following collection of adjustments to the air flow parameters of the oven. The set-up for drying and curing of the make coated web uses make-up air pressures controlled by dampers set to allow 10 to 20% of maximum air flow, a supply pressure controlled by dampers set to allow 60 to 90% of maximum air flow, exhaust dampers set to allow 40 to 80% of maximum air flow, and a recirculation pressure set by damper positions allowing 5 to 25% maximum air flow.

One preferred scheme for drying and curing of a non-woven web coated with an initial make coat as described in the invention includes a temperature set-point range of 110° to 147° C. and an oven residence time of from 1.0 to 2.0 minutes. As to the air flow parameters of this preferred mode, the make-up air pressures are controlled by dampers set to allow 40 to 60% of maximum air flow, supply pressure is controlled by dampers set to allow 80 to 100% of maximum air flow, exhaust dampers set to allow 80 to 100% of maximum air flow, and recirculation pressure is set by damper positions allowing 80 to 100% maximum air flow.

In one arrangement for drying and curing of a size coating or secondary make coating applied to the nonwoven web, i.e., following the applications and heat treatments of the prebond and an initial make coat described herein, the make-up air pressures could be controlled by dampers set to allow 40 to 60% of maximum air flow, a supply pressure controlled by dampers set to allow 80 to 100% of maximum air flow, exhaust dampers set to allow 80 to 100% of maximum air flow, and recirculation pressure set by damper positions allowing 80 to 100% of maximum air flow.

An alternate scheme for drying and curing of a size coated nonwoven web, or a web with a secondary make coat applied, makes the following collection of adjustments to the air flow parameters of the oven. In this alternate arrangement, the make-up air pressures controlled by dampers are set to allow 10 to 20% of maximum air flow, supply pressure is controlled by dampers set to allow 60 to 90% of maximum air flow, exhaust dampers are set to allow 40 to 80% of maximum air flow, and recirculation pressure is set by damper positions allowing 5 to 25% maximum air flow.

One preferred scheme for drying and curing of a size coated web, or a web coated with a secondary make coat, includes a temperature set-point range of 160° to 190° C. and an oven residence time of from 3.0 to 4.0 minutes. As the air flow parameters in this preferred mode, the make-up air pressures are controlled by dampers set to allow 40 to 60% of maximum air flow, supply pressure is controlled by dampers set to allow 80 to 100% of maximum air flow, exhaust dampers are set to allow 80 to 100% of maximum air flow, and recirculation pressure is set by damper positions allowing 80 to 100% maximum air flow.

An oven of hybrid design, which is described in greater detail hereinafter, which was developed by Industrial Heat Enterprises International Co., Franklin Wis. and Drying Systems Co., Minneapolis Minn., is suitable as the oven for the purposes of the present invention.

This oven was designed to be able to be capable of providing heated air flow oriented at an opposite impinging angle in the range of 3 to 5 radians to the subject material, a binder-coated nonwoven web in this case, being dried. Controls were provided for adjusting air temperature from ambient to about 250 degrees Centigrade, air supply pressure capabilities of about −0.5 to nearly 0.5 inches of water, and air exhaust pressure capabilities of nearly −0.5 to 0.5 in. of water, as well as the ability to control heated air recirculation and fresh air make-up pressures from atmospheric to about 0.5 inches of water. Airflow directional control was provided by passing heated air through a series of nozzles and perforated plates prior to contact with the subject material. Pressure drops across such directional aids was minimized by maintaining a minimum open area of 4 to 5%.

The oven of hybrid design obtained from Industrial Heat Enterprises International Co., Franklin Wis., or Drying Systems Co., Minneapolis Minn., operates according to the following useful relationship between pressures, temperatures, and heated air velocities.

$V=[P\times(460+T)\times 30356]^{1/2}$ where: V=Estimated heated air velocity (feet/min.)

P=Pressure differential between heated air supply and used air exhaust (inches of water)

T=Temperature (degrees Fahrenheit)

While it ordinarily is more convenient to coat a preformed batt or web with the modifying agent, as described above, it is also contemplated to coat continuous individual fibers with the modifying agent and then heat-cure the coating on the fibers. Thereafter, these pretreated fibers can be chopped into staple fibers and are formed into a web for prebond, make and/or size coat treatments of which any can be based on resole phenolic binder precursors.

The nonwoven webs suitable for use in the instant invention composition may be prepared via any conventional web formation equipment, with the proviso that the chosen equipment can successfully process the prescribed staple fiber. Suitable web formation equipment may include those operating on the wet-lay system, the air-lay system, or mechanical systems such as cards and garnets. Especially useful equipment includes, but is not limited to, air-lay equipment such as that known commercially as "Rando Webber" or "DOA" or a hybrid system known as a "Hergeth" randomizing card. The operating parameters for such equipment are well known to those normally skilled in the art.

Nonwoven abrasive articles within the present invention may take any of a variety of conventional converted forms such as sheets, blocks, strips, belts, brushes, rotary flaps, discs, or solid or foamed wheels. Especially useful forms are discs, sheets, and wheels. These forms are provided by assembling multiple layers of the nonwoven abrasive articles of this invention in a stacked or wound manner in multiple layer form and then consolidating the webs into a laminate useful in grinding, polishing and finishing, such as used in conjunction with power-driven grinding equipment. In one embodiment, the prebonded flat stock web is cut into round disc shapes, such as with a die, and the disc shapes are then make and size coated.

The nonwoven abrasive article of this invention also can be spirally wound about a core to provide the above-mentioned converted forms. For example, the nonwoven abrasive articles of this invention can be converted into a spirally wound configuration, followed by curing the convolutely wound bun. Abrasive wheels of suitable widths can be formed as cut slices from this bun, where the cuts are made in a direction perpendicular to the axis of the winding support or core. The wheels are typically in the form of a right circular cylinder having dimensions which may be very small, e.g., a cylinder height on the order of a few millimeters, or very large, e.g., two meters or more, and a diameter which may be very small, e.g., on the order of a few centimeters, or very large, e.g., one meter or more. The wheels typically have a central opening for support by an appropriate arbor or other mechanical holding means to enable the wheel to be rotated in use. One of ordinary skill will be able to judiciously select wheel dimensions, configurations, means of support, and means of rotation, and the like, for using the abrasive wheels of this invention in grinding, polishing and/or finishing operations.

Abrasive articles of larger dimensions may be made by the preparation of multi-layer "slabs" or "buns". Uncured or partially cured layers of nonwoven abrasive sheet materials of the invention may be stacked, compressed and fully cured to make a layered composite structure capable of being converted into useful articles of substantial dimensions. This layered composite may be used as the source of a multitude of articles of the invention, each having various diameters, or all having the same diameter, as required by the users. Articles of the invention may be produced from the layered composites by machining, using appropriate techniques which are also well known in the art. For example, a wheel shape may be die cut from a slab of the layered composite.

Alternatively, ribbons, strips, or elongated segments of the nonwoven abrasive sheet may be spirally wound into a wheel shape while the binder is uncured or partially cured and thereafter fully cured to directly yield an abrasive wheel structure.

It is also contemplated to be within the scope of the invention to employ the abrasive article of this invention in laminated form together with at least one other different type of layer combining different handling capability, strength property, abrasive property, and so forth, to form a composite article capable of multiple purposes and/or manners of usage. Also, the abrasive articles of this invention can be fastened to a rigid holder and handle, if desired, by any convenient adhesive or mechanical attachment means.

The features and advantages of the present invention will be further illustrated by the following non-limiting examples. All pans, percentages, ratios, and the like, in the examples are by weight unless otherwise indicated.

EXAMPLES

Experimental Procedure:

Cut Test

Wet Schiefer Test: This test provided a measure of the cut (material removed from a workpiece). A 10.16 cm diameter circular specimen was cut from the abrasive material to be tested and secured by hook and loop drive pad Dual-Lock Type 170, available from 3M Co., St. Paul, Minn. One side of the Dual-Lock Type 170 is connected to a mandred locked into the chuck of a motor-driven spindle. The Dual-Lock Type 170 has a 10.2 cm diameter disc support with hooks (mushroom-shaped barbs) extending from the opposite surface of the disc to engage the abrasive web specimen. The abrasive specimen was pre-wetted by floating in water. An acrylic disc was secured to the driven plate of a Schiefer Abrasion Tester (available from Frazier Precision Company, Gaithersburg, Md.) which had been plumbed for wet testing. A circular acrylic plastic workpiece, 10.16 cm diameter by 317 cm thick, available under the trade designation ""POLYCAST"" acrylic plastic from Seelye Plastics, Bloomington, Minn. was employed. The initial weight of each workpiece was recorded to the nearest milligram prior to mounting on the workpiece holder of the abrasion tester. The water drip rate was set to 60 (±6) grams per minute. A 2.26 kg load was placed on the abrasion tester weight platform and the mounted abrasive specimen was lowered onto the workpiece. The machine was set to run for 5,000 cycles and then automatically stop. After each 5,000 cycles of the test, the workpiece was wiped free of water and debris and weighed. The cumulative cut for each 5,000-cycle test was the difference between the initial weight and the weight following each test.

Wear Test

The following accelerated wear test procedure was used to compare the abrasive webs of the examples. A "Gardner Heavy Duty Wear Tester No. 250", commercially available from Pacific Scientific, Gardner/Neotec Instrument Division, Silver Spring, Md., was provided with a clamping means to retain a 4"×26" (102 mm×660 mm) sheet of open-mesh abrasive fabric (available under the trade designation "Wetordry™ Fabricut Type 21N", grade 32 silicon carbide from 3M, St. Paul, Minn.) and a stainless steel tray to retain water during wet testing. In operation, the testing machine is designed to apply a 2.5 kg downward load to the test specimen while linearly moving the test specimen left-to-right and right-to-left in contact with the abrasive mesh fabric at a rate of 45 full cycles per minute.

The open mesh abrasive fabric was clamped to the bottom of the test platform. Test specimens were cut to dimensions 2.5"×9.25" (63.5×235 mm) and weighed to the nearest milligram. About one cup (approximately 240 milliliters) of water was poured into the test platform. A test specimen was placed on the immersed abrasive mesh fabric, the weight lowered onto it, and the machine started. After 200 cycles, the specimen was removed, dried in an oven at 250° F. (116° C.) for 15 minutes, and weighed. Wear tests were conducted on two specimens for each example: one each for both the top and bottom of the abrasive article. The percent wear was calculated with a correction for the worn area of the specimen. The percent wear is then calculated by:

$$\% \text{ Wear}=(((IW-FW)/IW)(\text{Area of Wear})(\text{Correction Factor}))\div 4.27;$$

where:

IW=Initial weight in mg;

FW=Final weight in mg;

Area of Wear=2.54×100

Correction Factor=0.632.

Tear Test

Machine direction (md) and cross-machine direction (cd) tear tests were performed according to the specification in ASTM Standard D 1424, "Tear Resistance of Woven Fabrics by Falling-Pendulum (Elmendorf) Apparatus". A 6.4 kg pendulum was employed. Results are reported as dimensionless numbers on a scale of 0–100.

Web Tensile Testing

Machine direction (red) and cross-machine direction (cd) tensile tests were performed according to the specification of ASTM D 1682, Method 2C-T, and which is incorporated herein by reference. Tensile strength and % elongation were recorded.

Water Tolerance Test

The amount of water (percent by weight of resin) that a phenolic resin will tolerate before phase-separation serves as an indicator as to how much water may be added as solvent and how far the resin has advanced in molecular weight. A 50.0 gram sample of resin to be tested was brought to 25° C. in a 250 ml. beaker and the beaker and contents were weighed. With the sample mixing via a magnetic stirrer, small increments of distilled water were added, allowing the resin to mix with the water after each water addition until a homogeneous mixture was reached. The endpoint occurred when the resin/water solution began to turn permanently milky in appearance; i.e., when the water and resin could not be mixed without a milky appearance remaining after thorough stirring. After the endpoint was reached, the beaker and contents were weighed, and the water tolerance calculated as (A–B)×100%, where A=final weight of the beaker contents and B=initial weight of the resin and beaker.

Phenolic Resin

The phenolic resins used in the following examples, in general, each are a resole precondensate of a 2:1 molar ratio mixture of formaldehyde:phenol in a water solution with sodium hydroxide catalyst. The trade designations and further details on the formulations associated with the various phenolic resins used are indicated in the examples.

Examples 1–3 and Comparative Examples A–C

Nonwoven abrasive articles formed of nylon 6,6 staple fiber were prepared as follows. Two coatings were applied to each example web: a prebond coating of a rubber-modified phenolic resin and a make coating comprising phenolic resin and mineral abrasive as the final coating. The modifying agent was added to the prebond coat used in Examples 1–3, but omitted from the prebond coat of Comparative Examples A–C.

A 15 mm thick low-density non-woven web weighing 130 $g/m^2$ was formed from combining 80% by weight of the total weight of the untreated web low-tenacity nylon 6,6 staple fiber (commercially available under the trade designation "Type T-852" from E. I. DuPont de Nemours, Wilmington, Del.) having a tenacity of 4.6 g/denier and fiber length about 38 mm, and the remaining 20% by weight of the web constituted by high-tenacity nylon 6,6 fibers (commercially available under the trade designation "Type T-885" from E. I. DuPont de Nemours, Wilmington, Del.) having a tenacity 8.2 g/denier, fiber length of about 38 min. The web was formed on a web-forming machine available under the trade designation "Dr. O. Angleitner" ("DOA"), commercially available from Dr. O. Angleitner, Weis, Austria.

The particular phenolic resins and modifying agent used in the various abrasive articles of Examples 1–3 and Comparative Examples A–C are described in Table 1, the various components of the prebond coat as shown in percent by weight. The prebond coating was applied to the web via a conventional tworoll coater. Following the prebond coat, the web and prebond coating was heated for curing in the oven according to the oven Operation Procedure set forth supra. Each prebonded web then was inverted and the opposite side of the web received a make coating comprising a spray coating consisting of 25.2 parts phenolic resin available under the trade designation "BB-062", obtained from Neste Resins Corp., Mississauga, Ontario, Canada, 10.2 parts water, 58 pans grade 280 and finer aluminum oxide abrasive particles, 4.4 parts calcium carbonate, 1.1 parts isopropyl alcohol, and 1.1 parts water-based red dye for pigmentation. The nonwoven webs of these examples were completed as of the make coat, and no size coat or secondary make coat was applied on these example webs. In any event, the cured abrasive articles, after the completion of the make coat step, were tested for physical properties and end-use characteristics. In this regard, all example webs were tested for wear (top and bottom), top cut, tear resistance, tensile strength and elongation properties. The test results are shown in Table 2 along with the final web thickness.

TABLE 1

| Prebond Coating | Comp. Example A | Comp. Example B | Comp. Example C | Example 1 | Example 2 | Example 3 |
|---|---|---|---|---|---|---|
| Phenolic resin[1] | 100 | none | none | 70 | none | none |
| Phenolic resin[2] | none | 95 | none | none | 67 | none |
| Phenolic resin[3] | none | none | 95 | none | none | 67 |
| Hycar ® 1581[4] | none | none | none | 30 | 29 | 29 |
| urea[5] | none | 5 | 5 | none | 5 | 5 |

[1]BB062, phenolic resin, available from Neste Resins Corporation, Mississauga, Ontario Canada.
[2]RZ680, NaOH catalyzed phenolic resin, 74% solids, resole/phenolic
[3]RLS 55 440, KOH catalyzed phenolic resin, 73% solids, resole/phenolic
[4]carboxy-modified butadiene-acrylonitrile latex, 46% solids, commercially available from B.F. Goodrich, Cleveland, OH.
[5]Reagent Grade urea, 5% solids solution, available from J.T. Baker Chemical Co.

TABLE 2

| Property | Comp. Example A | Comp. Example B | Comp. Example C | Example 1 | Example 2 | Example 3 |
|---|---|---|---|---|---|---|
| top wear, % | 15.6 | 14.7 | 21.3 | 15.9 | 15.9 | 14.4 |
| bottom wear, % | 16.2 | 15.7 | 17.5 | 15.5 | 14.9 | 16.0 |
| top cut, g. | 3.5 | 3.38 | 3.72 | 3.36 | 3.6 | 3.58 |
| bottom cut, g. | 3.81 | 3.84 | 3.39 | 3.54 | 3.93 | 3.65 |
| tear, md | 34.2 | 32.6 | 43.6 | 60.8 | 39.4 | 93.6 |
| tensile, md, lb./2" | 35.1 | 40.4 | 31.9 | 40.3 | 44.0 | 39.6 |
| tensile, cd, lb./2" | 23.0 | 23.7 | 21.1 | 27.0 | 25.6 | 25.2 |
| elong., md, % | 23.0 | 13.2 | 17.8 | 19.6 | 20.9 | 19.1 |
| elong. cd, % | 31.1 | 32.5 | 29.2 | 43.9 | 39.5 | 38.5 |
| thickness, inches | 0.387 | 0.397 | 0.390 | 0.417 | 0.433 | 0.430 |

The data results in Table 2 indicated an increase in tear resistance and modest increases in tensile strength in Examples 1–3, while maintaining other properties within acceptable limits, even though lower tenacity fibers (i.e., 4.6 g/denier) were used in the webs of these examples. These results show the effect of the modifying agent, as added to the prebond coating, as compensating for the diminished fiber orientation by preventing an otherwise lessened resistance to phenol attack in the lower tenacity fibers.

Oven Equipment and Operation Procedure

The oven configuration used in all of the examples, 4–8, D–F, below was a hybrid design oven developed by Industrial Heat Enterprises International Co., Franklin Wis., and the Drying Systems Co., Minneapolis Minn.

Unless indicated specifically otherwise in the example, the following oven settings were employed uniformly throughout all examples 4–8 and D–F below for the various binder coatings indicated:

(a) Drying and curing of prebond coating: mean temperature setpoint=171° C.; maximum available air velocity for each major air pathway=180 feet/minute (55 meters/minute); residence time=3.0 minutes; mean make-up air damper setting=38% of maximum air flow; mean supply pressure damper setting=44% of maximum air flow; mean exhaust pressure damper setting=72% of maximum air flow; and mean recirculation pressure damper setting=74% maximum air flow.

(b) Drying and curing of the initial make coating: mean temperature setpoint=167° C.; maximum available air velocity for each major air pathway=180 feet/minute (55 meters/minute); residence time=3.0 minutes; mean make-up air damper setting=35% of maximum air flow; mean supply pressure damper setting=44% of maximum air flow; mean exhaust pressure damper setting=71% of maximum air flow; and mean recirculation pressure damper setting=67% of maximum air flow.

(c) Drying and curing of subsequent make coatings: mean temperature setpoint=167° C.; maximum available air velocity for each major air pathway=180 feet/minute (55 meters/minute); residence time=3.0 minutes; mean make-up air damper setting=35% of maximum air flow; mean supply pressure damper setting=44% of maximum air flow; mean exhaust pressure damper setting=71% of maximum air flow; and mean recirculation pressure damper setting=67% of maximum air flow.

Examples 4–8 and Comparative Examples D–F

Examples 4–8 and Comparative Examples D, E and F were prepared identically to those in the Examples 1–3 and Comparative Examples A–C above with the following differences. For one, in Examples 4–8 and Comparative Examples D–F, the webs were constructed exclusively of the low-tenacity polyamide fiber or the high-tenacity polyamide fiber, respectively. That is, Examples 4–8 employed 100% by weight of the untreated web nylon 6,6 staple fiber (commercially available under the trade designation "Type T-852" from E. I. DuPont de Nemours, Wilmington, Del.) having a tenacity of 4.6 g/denier and fiber length about 38 mm, while Comparative Examples D, E and F used 100% by weight of the untreated web as constituted by high-tenacity nylon 6,6 fibers (commercially available under the trade designation "Type T-885" from E. I. DuPont de Nemours, Wilmington, Del.) having a tenacity 8.2 g/denier, fiber length of about 38 min. The lenacities of the fibers used to constitute the webs are indicated in Table 4. Additionally, the prebond roll coatings and make spray coatings used instead had the specific formulations indicated in % by weight in Table 3. The combination of sequential prebond coat and make coat used for any one example is indicated in Table 4. In Tables 3 and 4, "PC" means the prebond coating composition while "MC" means the make coating composition.

The abrasive articles were tested for physical properties after the prebond coating was cured, with the test results shown in Table 5. End-use performance also was tested after the make spray coating was applied and cured, with the results shown in Table 6.

TABLE 3

| Component | PC-1 | PC-2 | PC-3 | PC-4 | PC-6 | MC-1 | MC-2 | MC-3 |
|---|---|---|---|---|---|---|---|---|
| water | 22.9 | 19.97 | 17.04 | 14.12 | 16.89 | 10.2 | 9.23 | 11.56 |
| phenolic resin[6] | 73.2 | 65.86 | 58.56 | 51.24 | 48.47 | 25.2 | 22.68 | 23.84 |
| red dye[7] | 3.9 | 3.9 | 3.9 | 3.9 | 3.9 | 1.1 | 1.1 | 1.1 |
| Hycar ® 2679[8] | — | 10.25 | 20.50 | 30.74 | 30.74 | — | 3.53 | — |
| Hycar ® 1581 | — | — | — | — | — | — | — | — |
| $Al_2O_3$[9] | — | — | — | — | — | 58.0 | 58.0 | 58.0 |
| $CaCO_3$ | — | — | — | — | — | 4.4 | 4.4 | 4.4 |
| isopropanol | — | — | — | — | — | 1.1 | 1.1 | 1.1 |
| antifoam[10] | 0.15 | 0.15 | 0.15 | 0.15 | 0.15 | — | — | — |

[6]BB-062 phenol formaldehyde resin, Neste Resins Corp., Mississauga, Ontario Canada.
[7]water-based red dye for pigmentation
[8]anionic emulsion of acrylic ester copolymer in water, available from B.F. Goodrich, Cleveland, OH.
[9]Grade 280 and finer particle sizes
[10]"1520" antifoaming agent, available from Dow Corning Corp., Midland, MI.

TABLE 4

| Example | Fiber tenacity (g/denier) | Prebond Coat (PC) | Make Coat (MC) |
|---|---|---|---|
| Comparative D | 8.2 | PC-1 | MC-1 |
| Comparative E | 4.6 | PC-1 | MC-1 |
| 4 | 4.6 | PC-2 | MC-1 |
| 5 | 4.6 | PC-3 | MC-1 |
| 6 | 4.6 | PC-4 | MC-1 |
| 7 | 4.6 | PC-4 | MC-2 |
| 8 | 4.6 | PC-6 | MC-3 |
| Comparative F | 4.6 | PC-1 | MC-2 |

TABLE 5

| Example | Tear Strength, g. | Tensile Strength, lb./2", md | Elongation, %, md | Tensile Strength, lb./2", cd | Elongation, %, cd |
|---|---|---|---|---|---|
| Comparative D | 61 | 11.7 | 32.7 | 18.9 | 45.5 |
| Comparative E | 35 | 20.9 | 30.9 | 19.0 | 36.7 |
| 4 | 40 | 15.7 | 35.8 | 17.5 | 48.1 |
| 5 | 45 | 15.1 | 37.5 | 15.9 | 55.9 |
| 6 | 50 | 13.4 | 35.4 | 17.0 | 58.6 |
| 7 | 50 | 13.4 | 35.4 | 17.0 | 58.6 |
| 8 | 28 | 15.1 | 33.7 | 20.9 | 47.7 |
| Comparative F | 35 | 20.9 | 30.9 | 19.0 | 36.7 |

The Table 5 (prebonded web data) shows the benefit of the modified prebond resin when incorporated into abrasive article webs containing lower tenacities. The tear strength of Comparative Example E, which contains a fiber of 4.6 g/denier tenacity that was not contacted with the modifier, i.e., Hycar® 2679 before or contemporaneous with first contact with the phenolic resin, was substantially lower than that of Comparative Example D, containing web fibers of 8.2 g/denier in tenacity. As the modifier was added to Examples 4–8, the tear resistance increased to an acceptable level while other physical properties were not compromised by the presence of the modifier. On the other hand, in Comparative Example F where the modifier was not added to the prebond coating until the make coat, after the low tenacity fibers had been contacted with phenolic resin in the prebond coating, the elongation properties of the prebond coated web were significantly inferior to those of Examples 4–8. Also, the prebond coatings of Examples 4–8 using the modified phenolic resins did not need to include nor contend with the VOC material isopropanol to achieve the advantageous results.

TABLE 6

| Example | Comp. D | Comp. E | Example 4 | Example 5 | Example 6 | Example 7 | Example 8 | Comp. F |
|---|---|---|---|---|---|---|---|---|
| Tear strength, g. | 56 | 18 | 22 | 36 | 35 | 43 | 21 | 18 |
| Tensile Strength, lb./2", md | 18.8 | 22.8 | 19.3 | 17.8 | 20.0 | 18.6 | 17.0 | 22.9 |
| Elong., %, md | 28.9 | 24.5 | 28.2 | 25.4 | 33.2 | 31.5 | 24.0 | 25.8 |
| Tensile Strength, lb./2", cd | 24.5 | 19.4 | 18.9 | 17.5 | 20.5 | 19.1 | 18.5 | 18.0 |
| Elong., %, cd | 43.2 | 36.2 | 41.6 | 52.1 | 54.6 | 58.2 | 44.7 | 35.9 |
| Cut, g. | 3.48 | 3.41 | 3.41 | 3.41 | 3.47 | 3.45 | 3.46 | 3.34 |
| Wear, g. | 19.1 | 12.3 | 14.7 | 16.9 | 16.5 | 16.3 | 14.6 | 12.6 |
| Mineral Wt., g. | 3.65 | 3.98 | 3.54 | 3.79 | 3.70 | 3.59 | 3.93 | 3.81 |
| Thickness, in. | 0.53 | 0.53 | 0.51 | 0.49 | 0.49 | 0.48 | 0.47 | 0.49 |

The Table 6 (make coated web dam) shows that the substantial losses in tear resistance were observed when the lower tenacity fibers (i.e., 4.6 g/denier) in Comparative Example D were substituted for the higher tenacity fibers (i.e., 8.2 g/denier) of Comparative Example E where the modifying agent was not added to the prebond coating. On the other hand, substantial losses in tear strength, elongation (cd), cut and wear properties were observed when the lower tenacity fibers (i.e., 4.6 g/denier) in Comparative Example F were substituted for the higher tenacity fibers (i.e., 8.2 g/denier) of Comparative Example E where the modifying agent was not added to the prebond coating and, instead, added later in the make coating after the fibers were exposed to phenolic resin in the prebonding step. In contrast, the coated nonwoven webs of Examples 4–8 showed significant improvements in tear properties while maintaining acceptable properties in the other categories of physical properties tested.

Examples 9–14 and Comparative Examples G and H

As an investigation on the consistency and repeatability of the restfits, the following additional tests were conducted. Examples 9–14 and Comparative Examples G and H were prepared identically to those in the Examples 1–3 and Comparative Examples A–C above with the following differences. For one, in Examples 9–14 and Comparative Examples G and H, the webs were constructed exclusively of the low-tenacity polyamide fiber or the high tenacity-polyamide fiber, respectively. That is, Examples 9–14 employed 100% by weight of the untreated web nylon 6,6 staple fiber (commercially available under the trade designation "Type T-852" from E. I. DuPont de Nemours, Wilmington, Del.) having a tenacity of 4.6 g/denier and fiber length about 38 mm, while Comparative Examples G and H used 100% by weight of the untreated web as constituted by high-tenacity nylon 6,6 fibers (commercially available under the trade designation "Type T-885" from E. I. DuPont de Nemours, Wilmington, Del.) having a tenacity 8.2 g/denier, fiber length of about 38 mm, and a denier of 12. The tenacities of the fibers used to constitute the webs are indicated in Table 7.

Additionally, the prebond roll coatings and make spray coatings used had the formulations indicated in Table 7. The stone phenolic resin was used in all the prebond coatings of Examples 9–14 and Comparative Examples G and H, which was 2:1 phenol:formaldehyde (NaOH catalyzed), 100–200% in water tolerances, and 69–75% solids in water. Also, the same phenolic resin was used in all the make coatings of Examples 9–14 and Comparative Examples G and H, which was 2:1 phenol:formaldehyde (NaOH catalyzed), 100–200% in water tolerances, and 69–75% solids in water and 280/F $Al_2O_3$ grade and finer. In Table 7, "PC"

means the prebond coating composition while "MC" means the make coating composition. None of the prebond coatings or make coatings contained VOCs. The prebond coating and make coating applied to each web were heat-treated according to the oven Operation Procedure set forth supra.

The finished nonwoven abrasive articles were tested for physical properties after completion and curing of both the prebond coating and the make coating, with the test results shown in Table 8.

TABLE 7

| Example | Fiber Tenacity (g/denier) | PC | MC |
|---|---|---|---|
| 9 | 4.6 | 70/30 phenolic resin/Hycar ® 1581 | phenolic resin |
| 10 | 4.6 | 70/30 phenolic resin/Hycar ® 2679 | phenolic resin |
| 11 | 4.6 | 50/50 phenolic resin/Hycar ® 1581 | phenolic resin |
| 12 | 4.6 | 50/50 phenolic resin/Hycar ® 2679 | phenolic resin |
| 13 | 4.6 | 60/40 phenolic resin/Hycar ® 1581 | phenolic resin |
| 14 | 4.6 | 60/40 phenolic resin/Hycar ® 2679 | phenolic resin |
| Comparative G | 4.6 | phenolic resin | phenolic resin |
| Comparative H | 8.2 | phenolic resin | phenolic resin |

TABLE 8

| Property | Ex. 9 | Ex. 10 | Ex. 11 | Ex. 12 | Ex. 13 | Ex. 14 | Comp. Ex. G | Comp. Ex. H |
|---|---|---|---|---|---|---|---|---|
| top wear, % | 12.02 | 15.97 | 17.13 | 27.67 | 11.29 | 18.76 | 11.03 | 16.29 |
| bottom wear, % | 11.65 | 20.21 | 18.01 | 17.65 | 11.45 | 19.36 | 11.2 | 14.45 |
| top cut, g. | 3.74 | — | 3.72 | — | 3.59 | — | — | — |
| bottom cut, g. | 3.35 | — | 4.07 | — | 3.7 | — | — | — |
| tear, md | 35 | 40.2 | 52.6 | 63 | 42 | 51 | 26.4 | 69.2 |
| tensile, md, lb./2" | 36 | 27.9 | 53.3 | 36.7 | 41.4 | 32 | 23.6 | 36.3 |
| tensile, cd, lb./2" | 26.8 | 27 | 42.8 | 28.4 | 34.3 | 29.2 | 18.2 | 38.4 |
| elong., md, % | 17.2 | 26.3 | 37.7 | 35.8 | 32.3 | 36.2 | 19.9 | 25.9 |
| elong. cd, % | 35.4 | 35.3 | 46.9 | 60.2 | 46 | 49.5 | 27.2 | 44.2 |

Examples 15–18 and Comparative Examples I and J

Examples 15–18 and Comparative Examples I and J were prepared to demonstrate the efficacy of the modified phenolic resin used as a fiber bonding resin in spirally-wound wheels forms. In general, prebond coatings of various compositions were applied and cured. A make coating was then applied, the web wound into a spiral "bun", and coatings fully cured. From the cured bun, nonwoven abrasive wheels were obtained by slicing along a diameter perpendicular to the long axis of the bun.

More specifically, for each of these examples, a 15 mm thick-low density nonwoven web weighing 125 g/m$^2$ was formed from nylon 6,6 38-mm staple fibers. Examples 15 and 17, and Comparative Example I, each employed 100% by weight of the untreated web nylon 6,6 staple fiber (commercially available under the trade designation "Type T-101" from E. I. DuPont de Nemours, Wilmington, Del.) having a tenacity of 4.0 g/denier and fiber length about 38 mm. On the other hand, Examples 16 and 18, and Comparative Example J, each used 100% by weight of the untreated web as constituted by high-tenacity nylon 6,6 fibers (commercially available under the trade designation "Type T-852" from E. I. DuPont de Nemours, Wilmington, Del.) having a tenacity 4.6 g/denier, fiber length of about 38 mm.

The nonwoven web of each example was formed on a web-forming machine available under the trade designation "Rando Webber" and coated with a prebond resin of the composition (in % by weight) and at a dry solids add-on weight indicated in Table 9. The prebond resins were cured to a non-tacky condition by passing the coated web through the convection oven according to the oven Operation Procedure set forth supra. The resultant prebonded webs were each about 10 mm thick and had prebonded web weights (dried weights) indicated in Table 9. The data in Table 9 summarizes the fiber tenacity, prebond coating composition, and various physical properties of the prebonded webs of the examples.

TABLE 9

| Component | Ex. 15 | Ex. 16 | Comp. Ex. I | Comp. Ex. J | Ex. 17 | Ex.18 |
|---|---|---|---|---|---|---|
| Fiber Tenacity (g/denier) | 4.0 | 4.6 | 4.0 | 4.6 | 4.0 | 4.6 |
| xylol | 0 | 0 | 39.3 | 39.3 | 0 | 0 |
| MDA/ethoxy ethanol[11] | 0 | 0 | 16.1 | 16.1 | 0 | 0 |
| blocked 1,4-butylene glycol diisocyanate[12] | 0 | 0 | 44.6 | 44.6 | 0 | 0 |
| defoamer[13] | 0 | 0 | trace | trace | 0 | 0 |
| phenolic | 32 | 20 | 0 | 0 | 56 | 56 |

TABLE 9-continued

| Component | Ex. 15 | Ex. 16 | Comp. Ex. I | Comp. Ex. J | Ex. 17 | Ex.18 |
|---|---|---|---|---|---|---|
| resin[14] | | | | | | |
| acrylic emulsion[15] | 40 | 40 | 0 | 0 | 0 | 0 |
| water | 28 | 40 | 0 | 0 | 44 | 44 |
| dry coating weight, $g/m^2$ | 80 | 80 | 42 | 42 | 80 | 80 |
| total prebonded web weight, $g/m^2$ | 205 | 205 | 167 | 167 | 200 | 200 |
| tensile strength, lb/2" | 27.5 | 27.6 | 34.0 | 46.8 | 16.9 | 16.8 |
| % elongation | 42.8 | 42.8 | 96.3 | 74.1 | 25.9 | 25.6 |

[11]co-monomer solution of 35% by weight methylene dianiline (MDA) and 65% by weight 2-ethoxyethanol.
[12]co-monomer of ketoxime-blocked poly-1,4-butylene glycol diisocyanate having a molecular weight of about 1500 available under the trade designation "Adiprene BL-16" from Uniroyal Chemical Co. Inc., Middlebury, CT.
[13]silicone defoamer available under the trade designation "Q2" from Dow Corning, Midland, MI.
[14]75% by weight solids in water of a 2:1 formaldehyde:phenol precondensate with about 2% by weight NaOH catalyst.
[15]anionic emulsion of acrylic ester copolymer available under the trade designation Hycar ® 2679 from B.F. Goodrich, Cleveland, OH.

To each of the above prebonded webs of Examples 15 and 16, and Comparative Examples I and J, a make coating slurry having the following formulation was applied via a two-roll coater to each prebonded web:

21.7 parts "by weight Adiprene BL-16";

7.5 parts by weight methylene dianiline;

9.7 parts by weight "UCAR Phenoxy Resin PKHH, a co-monomer which is a 25% by weight solution of phenoxy resin in propylene glycol monomethyl ether acetate, available from Union Carbide Chemical Corp., Chicago, Ill.;

6.8 parts by weight lithium stearate premix, a lubricant which is a 44% by weight dispersion of lithium stearate, available from Witco Corp., Chicago, Ill., under the trade designation "Type FS") in propylene glycol monomethyl ether acetate;

7.8 parts by weight talc, a viscosity adjuster, available under the trade designation "Beaverwhite" from Cypress Industrial Minerals, Englewood, Colo.;

0.25 parts by weight "AEROSIL R-202", a modified silica viscosity adjuster, available from Degussa Corporation, Teterboro, N.J.;

0.85 parts by weight dibasic esters, a co-monomer, available from Univar Chemicals, Kirkland, Wash.;

22.7 parts by weight grade 150 silicon carbide abrasive particles, and 22.7 parts by weight grade 180 silicon carbide abrasive particles.

In a variation from the oven Operation Procedure set forth supra, each make-coated web was then passed through the convection oven described in the above Oven Equipment description but operated at about 150° C. for a residence period of about 2.1 minutes to partially dry and remove all but about 8% by weight of the volatile components of the make coat, based on the coated web final dry weight.

Then, the make-coated web was wound around a core in a wind-up stand. The make coating added 1,250 grams/sq. meter (on a dry basis) to the prebonded web.

Then, the make-coated web was unwound, and wound on to an adhesive-buttered glass fiber-reinforced core of internal diameter 7.62 cm. and wall thickness of 0.32 cm. An adhesive mixture containing equal amounts by weight of (1) a liquid epoxy resin (""EPON-828"", Shell Chemical Co., Houston, Tex.), which was a reaction product of hisphenol A and epichlorohydrin having an epoxy number of about 190 grams per epoxide equivalent and a hydroxy number of about 80 grams per hydroxy equivalent, and (2) a curative resin (""Versamid-125"", Henkel Chemical Company, Minneapolis, Minn.), which was a 100% solids amine terminated polyamide resin reaction product of polymeric fat acids and aliphatic polyamines having a viscosity of about 50,000 cps. at 21° C. and an amine value about 305 grams of resin per amine equivalent, was used such that the core surface was buttered uniformly to a thickness of about 2 mm. The steering of webs for proper alignment of the edges, known as the avoidance of "telescoping" in the argot of the art, the provision of appropriate tension and dancer rolls for this purpose, and the need of a packing roll against the core to provide for a tightly wound spiral are all known in the art of web handling in the production of all manner of flexible sheet goods. When sufficient web was wound around the core such that the nominal density of the cured bun would be about 11 $g/in^3$ (0.67 $g/cm^3$), the web was cut and the bun surface was wrapped in nylon film. The core of one end of the bun was sealed and the wrapped bun was placed in a convection oven set at 130° C. A vacuum of 20 torr was applied to the bun while the bun was allowed to cure for about 2 hours. The cured bun was taken out of the oven, allowed to cool to room temperature. The bun was sliced into nominal 2.54 cm wide disc-shaped slices using a lathe and a band saw. Individual slices were mounted on the mandrel of a lathe and dressed using a diamond tool to a nominal outer diameter of 20.32 cm.

Testing the Spirally-Wound Wheels

The wheel was mounted on a lathe and spun such that the velocity of its surface was about 6,000 feet/minute (1829 meters/minute). Each wheel and workpiece were weighed prior to testing. The edge of a type 1-304 stainless steel test piece of thickness 0.04" (1.02 mm) was held against the surface of the rotating wheel at a constant load of about 8 pounds per inch width of the wheel. A single grinding "cycle" constituted urging the workpiece against the rotating wheel for a period of 1 minute followed by removing the workpiece from the wheel for 20 seconds. After 4 cycles of grinding, the wheel and workpiece were weighed again. The loss of weight of the wheel and workpiece were calculated. The weight loss of the workpiece is in units of grams while weight loss by the wheel is in the dimensionless "% of wheel weight loss". The test data results are shown in Table 10.

TABLE 10

| Example | Density of Wheel (g/cu.in) | Cut (grams) | % of Wheel weight loss | Cut (grams), normalized to the same % wheel weight loss |
|---|---|---|---|---|
| Comp. Ex. I | 10.9 | 6.4 | 2.30 | 2.5 |
| Ex. 15 | 10.9 | 4.2 | 0.88 | 4.2 |
| Comp. Ex. J | 9.6 | 5.9 | 1.99 | 4.8 |

TABLE 10-continued

| Example | Density of Wheel (g/cu.in) | Cut (grams) | % of Wheel weight loss | Cut (grams), normalized to the same % wheel weight loss |
|---|---|---|---|---|
| Ex. 16 | 9.2 | 5.4 | 1.61 | 5.4 |

The data of Table 10 shows that, for the low-tenacity type of nylon staple fibers used in the webs of Examples 15 and 16, the prebonded web, which was prebonded with a mixture of resole phenolic resin and the Hycar® acrylic emulsion modifier, nonetheless provided adequate strength for the web to be processed through the abrasive slurry coating and the convolute spiral wrapping processes to yield cured buns. Also, the wheel of Example 16 performed better than Comparative Examples I and J insofar as the wheel Example 16 produced a higher normalized cut for the same % weight loss of wheel than that of the wheel of Comparative Examples I and J. The average of the normalized cut for Examples 15 and 16 (i.e., 4.8) was significantly higher than the average for Comparative Examples I and J (i.e., 3.65). Further, Examples 15 and 16 effectively reduce the need to handle and dispose of VOC's due to the use of a water-based prebond coating. In contrast, in Comparative Examples I and J, the solvent for the binder in the urethane-based prebond coating was nonwater based, whereby it becomes necessary to take precautionary measures to handle and dispose the VOC's during curing of the xylol and the ketoxime blocking agent of the urethane prepolymer. That is, the total amount of xylol and ketoxime VOC's used in Comparative Examples I and J, which comprises about 55% by weight of the total undefined compositions thereof, was avoided and omitted from the modified-phenolic prebond coatings of Examples 15 and 16. While the phenolic resin component of the undefined compositions of Examples 15 and 16 contained residual formaldehyde in small overall amounts of about 1–2% by weight, respectively, so that VOC's were not completely eliminated, the reduction of VOC's was very substantial in the prebond coating when compared to the approximately 55% by weight amount of VOC's used in the urethane-based prebond coatings of Comparative Examples I and J.

Example 19 and Comparative Example K

Example 19 and Comparative Example K were prepared to demonstrate the effectiveness of the present invention when practiced to make layered or "unitized" nonwoven abrasive wheels.

The prebond and make coatings for Example 19 were identical to those used in prior Example 15. The prebond and make coating for Comparative Example K were identical to those of prior Comparative Example I.

Four layers of prebond and make coated webs of Example 19 and Comparative Example K each were stacked together and placed in a platen press heated to 135° C. The web materials were compressed to a thickness of 1.26 cm and held at temperature for 15 minutes to produce abrasive "slabs". The partially-cured slabs were then removed from the press and cured further in a convection air oven for 90 minutes at 135° C. After allowing the slabs to cool to room temperature, abrasive wheels were cut from the slabs of dimensions 4" o.d.×0.5" i.d.×0.5" thick (10.2 cm o.d.×1.26 cm i.d.×1.26 cm thick). For testing, two previously weighed 1.26 cm wide wheels were ganged together to make an approximate 2.54 cm wide working surface for each example. After mounting to the mandrel of a lathe, the ganged wheels were rotated at 4775 rpm and a stainless steel coupon of known weight was urged against the periphery of the rotating wheel to a pressure of 13 psi for 4 minutes. The wheels and the coupons were weighed again. The difference in weights of the test coupon and the wheels provided the cut in grams and the wear in % weight loss, respectively. The results are shown in Table 11.

TABLE 11

| Example | Wheel desnity, g/in3 | Cut, g. | Wheel weight loss, % | Cut, g. normalized to the same % wheel weight loss and density |
|---|---|---|---|---|
| Comp. Ex. K | 5.90 | 1.074 | 1.8 | 1.074 |
| Ex. 19 | 6.49 | 1.41 | 2.2 | 1.049 |

Table 11 shows that the multi-layered unitized wheels constructed from prebonded web of the present invention performed essentially identically to the comparative example of current practice without the need to use high-tenacity polyamide staple fibers in the nonwoven web of the abrasive article.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An open low-density abrasive article, comprising in combination:

(a) a lofty, open, nonwoven three-dimensional fibrous web comprising a plurality of interentangled randomly-extending polyamide staple fibers including points of intersection and contact between said fibers, said points of intersection and contact between said fibers being bonded together to form a three-dimensionally integrated structure throughout said web, wherein said fibers have surfaces and a fiber tenacity of less than 5 g/denier;

(b) a plurality of abrasive particles dipersed throughout said web and securely adhered to said surface of said fibers; and (c) hardened resinous material dispersed throughout said web, said resinous material comprising (i) a phenolic resin comprising a cured product of a phernolic resing precursor, and (ii) a modifier comprising a rubber material in an amount effective to substantially prevent chemical degradation of said fibers.

2. The abrasive article of claim 1, wherein said rubber material is selected from the group consisting of acrylic rubber, natural rubber, polyisoprene and carboxy-modified nitrile rubber.

3. The abrasive article of claim 2, wherein said acrylic rubber comprises an acrylic ester copolymer.

4. The abrasive article of claim 1, wherein said phenolic resin comprises a resole phenolic resin.

5. The abrasive article of claim 1, wherein said fiber tenacity is in the range of 1.0 to 4.6 g/denier.

6. The abrasive article of claim 1, wherein said fibers have an average fiber diameter of from about 25 to 250 microns.

7. The abrasive article of claim 1, wherein said polyamide fibers are selected from the group consisting of polycapolactam fibers and fibers comprising polymers of hexamethylene diamine and adipic acid.

8. The abrasive article of claim 1, wherein said fibers have an average staple length of about 1.75 cm to about 15.0 cm.

9. The abrasive article of claim 1, wherein said fibers have an average staple length of about 3.0 cm to about 7.5 cm.

10. The abrasive article of claim 1, wherein said fibers have between 3.75 crimps/cm to about 6.5 crimps/cm.

11. The abrasive article of claim 1, wherein said fibers have between 3.9 crimps/cm to about 5.9 crimps/cm.

12. The abrasive article of claim 1, wherein said web comprises a web thickness between about 0.1 cm to about 2.5 cm.

13. The abrasive article of claim 1, wherein said abrasive particles having an average particle size in the range of 20 to 100 microns.

14. The abrasive article of claim 1, wherein said abrasive particles are an abrasive mineral selected from the group consisting of flint, diamond, garnet, silicon carbide, pumice, aluminum oxide, and mixtures thereof.

15. The abrasive article of claim 1, wherein said abrasive particles and said hard phenolic resin are contained in said web in a weight ratio of 1:1 to 4:1, respectively.

16. The abrasive article of claim 1, wherein said hard phenolic resin has a Knoop hardness value of least 40.

17. The abrasive article of claim 1, wherein said polyamide fibers a void volume of from 75% to 98%.

18. The abrasive article of claim 1, wherein said abrasive particles are present in said web in a range amount of from 80 to 400 grams per square meter.

19. The abrasive article of claim 1, wherein said resinous composition is present in said web in a range amount of from 50 to 250 grams per square meter.

20. An open low-density abrasive article, comprising in combination:

(a) a lofty, open, nonwoven three-dimensional fibrous web comprising a plurality of interentangled randomly-extending polyamide staple fibers having points of intersection and contact therebetween, wherein said fibers comprise surfaces and a fiber tenacity of less than 5 g/denier;

(b) a prebound composition dispersed throughout said web and comprising (i) a first phenolic resing comprising a cured phenolic resin precursor, and (ii) a modifier comprising a rubber material in an amount effective to substantially prevent chemical degradation of said fibers said prebonding composition bonding said fibers at points of intersection and contact; and (c) a make coat dispersed throughout said web comprising a second phenolic resin and a plurality of abrasive particles, said abrasive particles securely adhered to said surfaces of said fibers.

21. The abrasive article of claim 20, wherein said rubber material is selected from the group consisting of acrylic rubber, natural rubber, polyisoprene and carboxy-modified nitrile rubber.

22. The abrasive article of claim 20, wherein said acrylic rubber comprises an acrylic ester copolymer.

23. The abrasive article of claim 20, wherein said first phenolic resin comprises a resole phenolic resin.

24. The abrasive article of claim 20, wherein said fiber tenacity is in the range of 1.0 to 4.6 g/denier.

25. The abrasive article of claim 20, wherein said fibers have an average fiber diameter of from about 25 to 250 microns.

26. The abrasive article of claim 20, wherein said polyamide fibers are selected from the group consisting of polycaprolactam fibers and fibers formed of polymers of hexamethylene diamine and adipic acid.

27. The abrasive article of claim 20, wherein said fibers have an average staple length of about 1.75 cm to about 15 cm.

28. The abrasive article of claim 20, wherein said fibers have an average staple length of about 3.0 cm to about 7.5 cm.

29. The abrasive article of claim 20, wherein said fibers have between 3.75 crimps/cm to about 6.5 crimps/cm.

30. The abrasive article of claim 20, wherein said fibers have between 3.9 crimps/cm to about 5.9 crimps/cm.

31. The abrasive article of claim 20, wherein said web comprises a web thickness between about 0.1 cm to about 2.5 cm.

32. The abrasive article of claim 20, wherein said abrasive particles having an average particle size in the range of 40 to 250 microns.

33. The abrasive article of claim 20, wherein said abrasive particles are an abrasive mineral selected from the group consisting of flint, diamond, garnet, silicon carbide, pumice, aluminum oxide, and mixtures thereof.

34. The abrasive article of claim 20, wherein said abrasive particles are contained in a weight ratio to total phenolic resin in the range of 1:1 to 4:1, respectively.

35. The abrasive article of claim 20, wherein said first hard phenolic resin and said second hard phenolic resin each have a Knoop hardness value of least 40.

36. The abrasive article of claim 20, wherein said article has a void volume of from 75 to 98%.

37. The abrasive article of claim 20, wherein said prebonding composition is present in said web in a range amount of from 5 to 250 grams per square meter.

38. The abrasive article of claim 20, wherein said make coat is present in said web in a range amount of from 50 to 250 grams per square meter.

39. An open low-density abrasive article, comprising in combination:

(a) a lofty, open, nonwoven three-dimensional fibrous web comprising a plurality of interentangled randomly-extending polyamide staple fibers having points of intersection and contact therebetween, wherein said fibers have surfaces and a fiber tenacity of less than 5 g/denier;

(b) a prebonding composition dispersed throughout said web and comprising (i) an acrylic rubber in an amount of 2 to 25 percent, (ii) a first resole phenolic resin in an amount of 98 to 69 percent, (iii) and urea in an amount of 0 to 6 percent, all by weight percent, said prebonding composition bonding said fibers at points of intersection and contact; and (c) a make coat dispersed throughout said web, said make coat comprising a second resole phenolic resin and a plurality of abrasive particles, said abrasive particles securely adhered to said surfaces of said fibers.

40. A method for making an open low-density abrasive article without using volatile organic solvent compounds, comprising, in this sequence, the steps of:

(a) providing a lofty, open, nonwoven three-dimensional fibrous web comprising a plurality of interentangled randomly-extending polyamide staple fibers including points of intersection and contact between said fibers, wherein said fibers have surfaces and a fiber tenacity of less than 5 g/denier;

(b) applying a prebonding composition to said web in a manner effective to be dispersed throughout said web and in contact with said fibers said prebonding composition consisting essentially of a first phenolic resin precursor composition, and a modifier component comprising a rubber material in an amount effective to substantially prevent chemical degradation of said fibers;

(c) heating at a first heating temperature for a time sufficient to cure said prebonding composition, whereby said fibers are bonded together at said points of intersection and contact to form a three-dimensionally integrated structure throughout said web;

(d) applying a make coat to said web in a manner effective to be dispersed throughout said web, said make coat comprising a second phenolic resin precursor composition and a plurality of abrasive particles: and (e) heating at a heating temperature and for a time sufficient to provide a substantially complete cure of said second phenolic resin precursor composition, whereby said abrasive particles are adhered to said surfaces of said fibers.

41. The method of claim 40, wherein said rubber material is selected from the group consisting of acrylic rubber, natural rubber, polyisoprene and carboxy-modified nitrile rubber.

42. The method of claim 40, wherein said acrylic rubber comprises an acrylic ester copolymer.

43. The method of claim 40, wherein said first phenolic resin precursor composition comprises a mixture of formaldehyde, phenol and alkaline catalyst effective to promote a condensation reaction between said formaldehyde and phenol, wherein the molar ratio of formaldehyde to phenol is greater than or equal to 1.0.

44. The method of claim 40, wherein said second phenolic resin precursor composition comprises a mixture of formaldehyde, phenol and alkaline catalyst effective to promote a condensation reaction between said formaldehyde and phenol, wherein the molar ratio of formaldehyde to phenol is greater than or equal to 1.0.

45. The method of claim 40, wherein said fiber tenacity is in the range of 1.0 to 4.6 g/denier.

46. The method of claim 40, wherein said applying of said prebonding composition comprises coating said prebonding composition on at least one surface of said web by an application means selected from roll-coating means and spray-coating means.

47. The method of claim 40, wherein said applying of said make coat comprises coating said make coat on at least one surface of said web by an application means selected from roll-coating means and spray-coating means.

48. The method of claim 40, further comprising, after step (e), applying a size coat to said web in a manner effective to be dispersed throughout said web, said size coat comprising a third phenolic resin precursor composition, and then heating said web at a third heating temperature and for a third heating time sufficient to cure said third phenolic resin precursor composition.

49. The method of claim 48, wherein said size coat further comprises a plurality of abrasive particles.

50. The method of claim 40, wherein, in step (c), said first heating temperature is in the range of from 110° to 157° C. and said first heating time is in the range of from 1.5 to 2.5 minutes.

51. The method of claim 40, wherein, in step (e), said second heating temperature is in the range of from 110° to 147° C. and said second heating time is in the range of from 1.0 to 2.0 minutes.

52. The method of claim 48, wherein said third heating temperature is in the range of from 160° to 190° C. and said third heating time is in the range of from 3.0 to 4.0 minutes.

53. A method for making an open low-density abrasive article without using volatile organic solvent compounds, comprising, the steps of:

(a) providing a lofty, open, nonwoven three-dimensional fibrous web comprising a plurality of interentangled randomly-extending polyamide staple fibers including points of intersection and contact between said fibers, wherein said fibers have surfaces and a fiber tenacity of less than 5 g/denier;

(b) applying a prebonding composition to said web in a manner effective to be dispersed throughout said web and in contact with said fibers, said prebonding composition comprising a nonphenolic resin composition;

(c) heating at a first heating temperature and for a time sufficient to cure said prebonding composition, whereby said fibers are bonded together at said points of intersection and contact to form a three-dimensionally integrated structure throughout said web;

(d) applying a make coat to said web in a manner effective to be dispersed throughout said web, said make coat consisting essentially of a phenolic resin precursor composition, a plurality of abrasive particles, and a modifier component, said modifying component comprising a rubber material in an amount effective to substantially prevent chemical degradation of said fibers;

(e) heating said web at a heating temperature and for a second heating time sufficient to provide a substantially complete cure of said phenolic resin precursor composition, whereby said abrasive particles are adhered to said surfaces of said fibers.

54. The method of claim 53, wherein said nonphenolic resin composition is selected from the group consisting of epoxy, hide glue, urethane, acrylic resin, urea-formaldehyde, and melamine-formaldehyde.

55. The product of the method of claim 40.

56. The product of the method of claim 53.

57. An abrasive article comprising an integral stack comprising a plurality of superposed layers of abrasive nonwoven material, wherein said abrasive nonwoven material comprises, in combination:

(a) a lofty, open, nonwoven three-dimensional fibrous web comprising a plurality of interentangled randomly-extending polyamide staple fibers having points of intersection and contact therebetween, said points of intersection and contact between said fibers being bonded together to form a three-dimensionally integrated structure throughout said web, wherein said fibers have surfaces and a fiber tenacity of less than 5 g/denier;

(b) a plurality of abrasive particles dispersed throughout said web and securely adhered to said surfaces of said fibers; and (c) hardened resinous material dispersed throughout said web, said resinous material comprising (i) a phenolic resin comprising a cured product of a phenolic resin precursor, and (ii) a modifier comprising a rubber material in an amount effective to substantially prevent chemical degradation of said fibers.

* * * * *